(12) United States Patent  
Miller

(10) Patent No.: US 6,279,925 B1
(45) Date of Patent: Aug. 28, 2001

(54) SLED WITH INDEPENDENT STEERABLE SKIS THAT SIMULTANEOUSLY MOVE IN THREE DISTINCT DIRECTIONS

(76) Inventor: Bart W. Miller, 5692 W. Chestnut Ave., Littleton, CO (US) 80123

( * ) Notice: Subject to any disclaimer, the term of this patent is extended or adjusted under 35 U.S.C. 154(b) by 0 days.

(21) Appl. No.: 09/358,227

(22) Filed: Jul. 21, 1999

Related U.S. Application Data

(60) Provisional application No. 60/094,002, filed on Jul. 24, 1998.

(51) Int. Cl.$^7$ .................................................... B62B 13/12
(52) U.S. Cl. .......................... 280/22.1; 280/14.1; 280/16; 280/21.1; 280/22.1; 280/6.156
(58) Field of Search ................................ 280/14.1, 15, 16, 280/17, 18, 21.1, 22, 22.1, 6.154, 6.155, 6.156, 771, 778, 845, 606

(56) References Cited

U.S. PATENT DOCUMENTS

| | | | |
|---|---|---|---|
| 1,836,623 | * 12/1931 | Silvestri | 280/14.1 |
| 3,528,674 | * 9/1970 | Schwarz | 280/22.1 |
| 3,799,564 | * 3/1974 | Eisenschmid | 280/14.1 |
| 4,219,207 | * 8/1980 | Muir et al. | 280/22.1 |
| 4,334,691 | * 6/1982 | Scheib | 280/14.1 |
| 5,344,167 | * 9/1994 | Strouth | 280/14.1 |
| 6,068,269 | * 5/2000 | Bergeron | 280/21.1 |

* cited by examiner

Primary Examiner—Brian L. Johnson
Assistant Examiner—F. Zeender
(74) Attorney, Agent, or Firm—Sheridan Ross P.C.

(57) ABSTRACT

A method and apparatus for providing a sled having independently steerable skis is provided. The apparatus provides a sled having skis that move in three distinct directions in response to a single control input. Each of the skis is independently controlled, and can be used in combination or individually to control the movement of the sled. The sled may be provided with a seat for carrying a human occupant, or alternatively may be remotely controlled using extended levers, or servo motors operated remotely, such as by a radio frequency remote controller. The method of the present invention comprises controlling a sled by providing a control input to a first ski of a sled, wherein the control input simultaneously pushes down the ski in relation to the frame, rotates a forward end of the ski towards the center of the sled, and rotates the ski about its longitudinal axis such that an outside edge of the ski moves towards the frame of the sled and an inside edge of the ski moves away from the sled. The method of the present invention also includes providing such a control input to a second ski of the sled, or providing control inputs to the first and second skis simultaneously.

19 Claims, 7 Drawing Sheets

SLED WITH INDEPENDENT STEERABLE SKIS THAT SIMULTANEOUSLY MOVE IN THREE DISTINCT DIRECTIONS

This application claims the benefits under 35 U.S.C. §119(e) from U.S. Provisional Patent Application Ser. No. 60/094,002 entitled "SLED WITH INDEPENDENT STEERABLE SKIS THAT MOVE IN THREE DISTINCT DIRECTIONS" filed Jul. 24, 1998, which is incorporated by reference herein in its entirety.

FIELD OF THE INVENTION

The present invention relates to turning mechanisms used to steer sled or rail mechanisms which utilize two distinct runners or skis and which allow the skis to simultaneously turn in a variety of directions for improved control of the sled.

SUMMARY OF THE INVENTION

The present invention discloses a sled that is maneuverable and stable. It is an object of the present invention to provide a sled that the operator can turn and stop using simple control inputs. It is a further object of the invention to provide a sled that is inherently stable, and that can be operated over rough terrain. It is also an object of the invention to provide a sled that can be operated by individuals with physical disabilities.

A sled constructed in accordance with one embodiment of the present invention includes two skis, wherein each ski can be turned in three separate directions simultaneously in response to a single control input. Specifically, the input required to control each ski consists of pushing a pedal connected to the ski's steering assembly. Alternatively, the control input may be initiated by a hand operated lever or handle as opposed to a push pedal. The operator sits in a seat suspended between each ski's steering assembly. Control inputs from the operator are made using two foot pedals, which are interconnected to the two steering assemblies. The turning motions of the skis in response to the control inputs allow the sled to be turned when one pedal is depressed, or braked if both pedals are depressed simultaneously by means of a "snow plow" configuration. The lateral stability of the sled is assured by the relatively wide spacing of the skis.

According to one aspect of the present invention, high maneuverability is assured by the unique motions made by the individual skis in response to control inputs. The turning motions of the skis are particularly effective in enabling the sled to turn sharply to either the left or the right, because these motions mimic that of a skier. Thus the downhill ski in a turn is placed on its inside edge, and the forward portion of the ski rotates inwardly in relation to the rear portion. In braking, the skis assume a "snow plow" configuration, again like a skier.

In another aspect of the present invention, the sled may be constructed from commonly found materials. Conventional alpine skis may be used as the skis, or runners, of the sled. The frame of the sled may be constructed from any suitable material, such as PVC pipe, wood, or lightweight metal.

In yet another aspect of the invention, the sled may be operated over rough terrain, such as mogul fields. The skis of the sled are widely spaced to allow the sled to stand by itself when not in motion or otherwise in use. This stability also prevents the sled from tipping over while in operation and provides stability for those with physical disabilities. The skis are interconnected via a torsion member, which allows each ski to rotate individually around a central axis positioned substantially below the seat on the sled, thus creating a smooth, more stable ride when traversing rough terrain.

In a further aspect of the invention, the sled may optionally provide for hand operated controls or other control input means. Thus, a lever or levers accessible to the hands of the operator may be used in place of foot pedals. This application is especially useful for users whose legs have been amputated, or who have other disabilities associated with the lower extremities. In another application, the control levers may be extended to allow a person skiing behind the sled to control it. Alternatively, control inputs may be provided to the steering mechanisms via remote control, in which case the steering mechanisms are operated by a servo motor, or other suitable device. In yet another aspect of the invention, the steering mechanisms may be locked, to facilitate towing the sled behind another vehicle, such as a snow mobile.

In another aspect of the invention, the sled may be operated by disabled persons. The controls may be configured in many different ways to accommodate the abilities of various operators. Additionally, the relationship between the seat, steering mechanisms and skis is highly adjustable. The stability of the sled allows it to remain upright, even when the sled is standing still; control inputs from the operator are not required to maintain the balance of the sled.

In one aspect of the invention, control inputs may be provided by a joystick or a push-button switch, which in turn control servo motors to provide the force necessary to turn the skis. This configuration would allow even persons with extreme physical limitations to control the sled.

In yet another aspect of the invention, the sled may be configured for uses other than carrying an operator across snow-covered terrain. Thus, the sled may be used to tow objects behind another vehicle, or on the undercarriage of aircraft. The sled may additionally be adapted to operate over water, using floats, or on dry land, using wheels.

These and other objects and advantages will become readily apparent from the following detailed description of the invention and from the attached drawings.

DETAILED DESCRIPTION OF THE INVENTION

Figure 1:
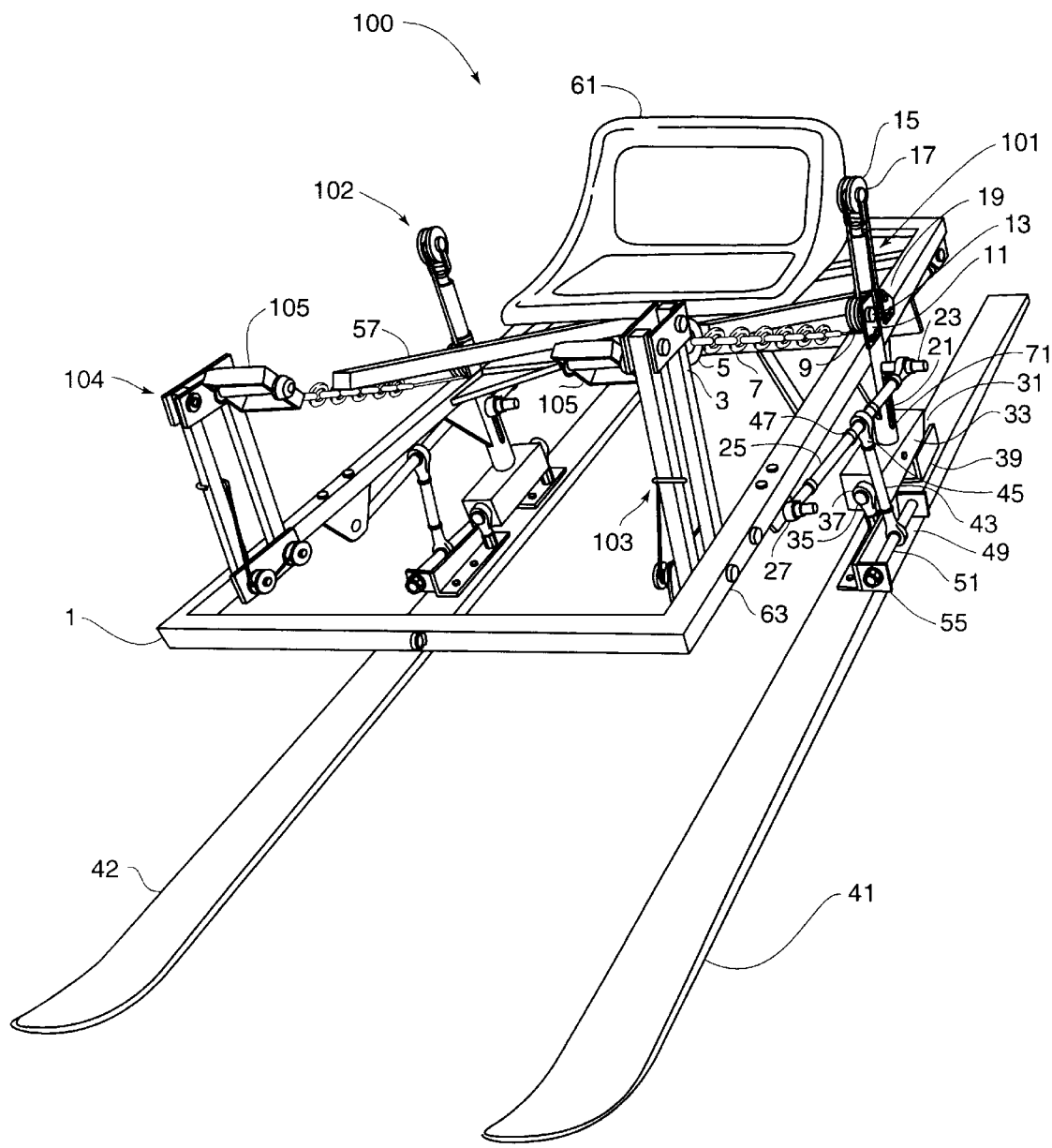
FIG. 1 is a front perspective view of an apparatus constructed in accordance with one embodiment of the present invention.

Referring now to FIGS. 1–5, a sled constructed according to one embodiment of the present invention is generally identified by reference numeral 100. As shown, the sled 100 generally comprises two skis 41 and 42, a steering assembly for each ski 101 and 102, and a frame 1 interconnected to the two steering assemblies. The following will describe the components on the left side of the sled. It will be appreciated that the right side of the sled is comprised of the same components, configured as a mirror image of those on the left side of the sled.

The ski 41 consists of an upraised tip, at the forward end of the sled, a tail at the rearward end of the sled, an inside edge on the side of the ski facing the center of the sled, and an outside edge on the side facing outwardly from the center of the sled. In response to a control input, the ski 41 makes three distinct movements simultaneously. The first motion is to move the ski 41 downward in relation to the frame of the sled 1 such that the distance between the frame 1 and the ski 41 is increased. The second motion is to rotate the ski 41 about the axis of the push shaft 21 such that the tip of the ski 41 moves towards the center of the sled 100, and the tail of the ski 41 moves away from the center of the sled 100. The third distinct motion is to rotate the ski 41 along its longitudinal axis such that the inside edge of the ski 41 is moved away from the frame 1, and the outside edge is moved towards the frame 1, thus placing the ski 41 on the inside edge of the ski 41.

The operator provides control input to the device through control means 103, which are connected to the steering assembly 101. The direction and speed of the sled is controlled by selectively depressing or releasing the steering control means 103 and 104. The steering control means 103 consists generally of control lever 107 carrying a pedal 105. Opposite the pedal 105, the control lever is attached to the frame 1 in such a way that it is free to pivot about the attachment point. Adjacent to the pedal 105 is an eyelet 5 connected to a chain 7, which is in turn connected to a pedal cable 9. The pedal cable 9 travels beneath the pedal cable pulley 11, which is attached to the frame 1 by the pedal cable pulley bolt 13. From the pedal cable pulley 11 the cable 9 rises to travel around the push shaft pulley 15. In an alternative embodiment, the pedal cable pulley 11 may be located on the push shaft housing 71, and the push shaft pulley 15 may be concentric to the radius arm control shaft 23. The pedal cable then terminates at the pedal cable anchor bolt 19.

The steering assembly 101 generally comprises in one embodiment a push shaft pulley 15, attached to the top of a push shaft 21 by the push shaft pulley bolt 17. The push shaft 21 is free to rotate about its axis and to move along its axis within the push shaft housing 71. One end of the radius arm 25 is connected to the push shaft 21 by radius arm control shaft 23. Where both front and back radius control arms 25 are used, the ends that terminate at the radius arm control shaft 23 are disposed on opposite sides of the push shaft 21. The other end of the radius arm 25 is connected to the frame 1 by radius arm pivot 27 at radius arm pivot bracket 29. At its lower end, the push shaft is connected to the push shaft pivot housing 31 by the push shaft pivot housing roll pin 33, oriented such that its axis is perpendicular to the direction of travel of the ski 41.

The push shaft pivot housing 31 is joined by the ski pivot joint bolt 37, oriented such that it is perpendicular to the push shaft pivot housing roll pin 33, and parallel to the major axis of the ski 41, to the front and rear ski pivot joints 35. The ski pivot joints 35 are rigidly fixed to the ski 41 at the ski pivot joint bracket 39.

A lower tilt control shaft 51, oriented parallel to the major axis of the ski and offset from the ski's centerline, is mounted to the ski 41 by tilt shaft bracket 55. Rising from the lower tilt control shaft 51 and connected thereto in such a way that it can rotate about the axis of the lower tilt control shaft 51, is the lower tilt control rod joint 49, which carries the tilt control rod 43. The upper portion of the tilt control rod 43 terminates in the upper tilt control rod joint 45. The upper tilt control rod joint 45 is connected to the radius arm 25 in such a way that it can rotate freely about the axis of the radius arm 25. The position of the upper tilt control rod joint 45 along the radius arm 25 is maintained by the tilt joint nuts 47, and this position can be adjusted, thereby altering the degree of tilt imparted to the ski 41, by adjusting the tilt joint nuts 47. Additional components include a brake 57, which is pivoted on the frame 1 at the brake pivot 59, and a seat 61, adjustably attached to the frame 1.

Figure 6:
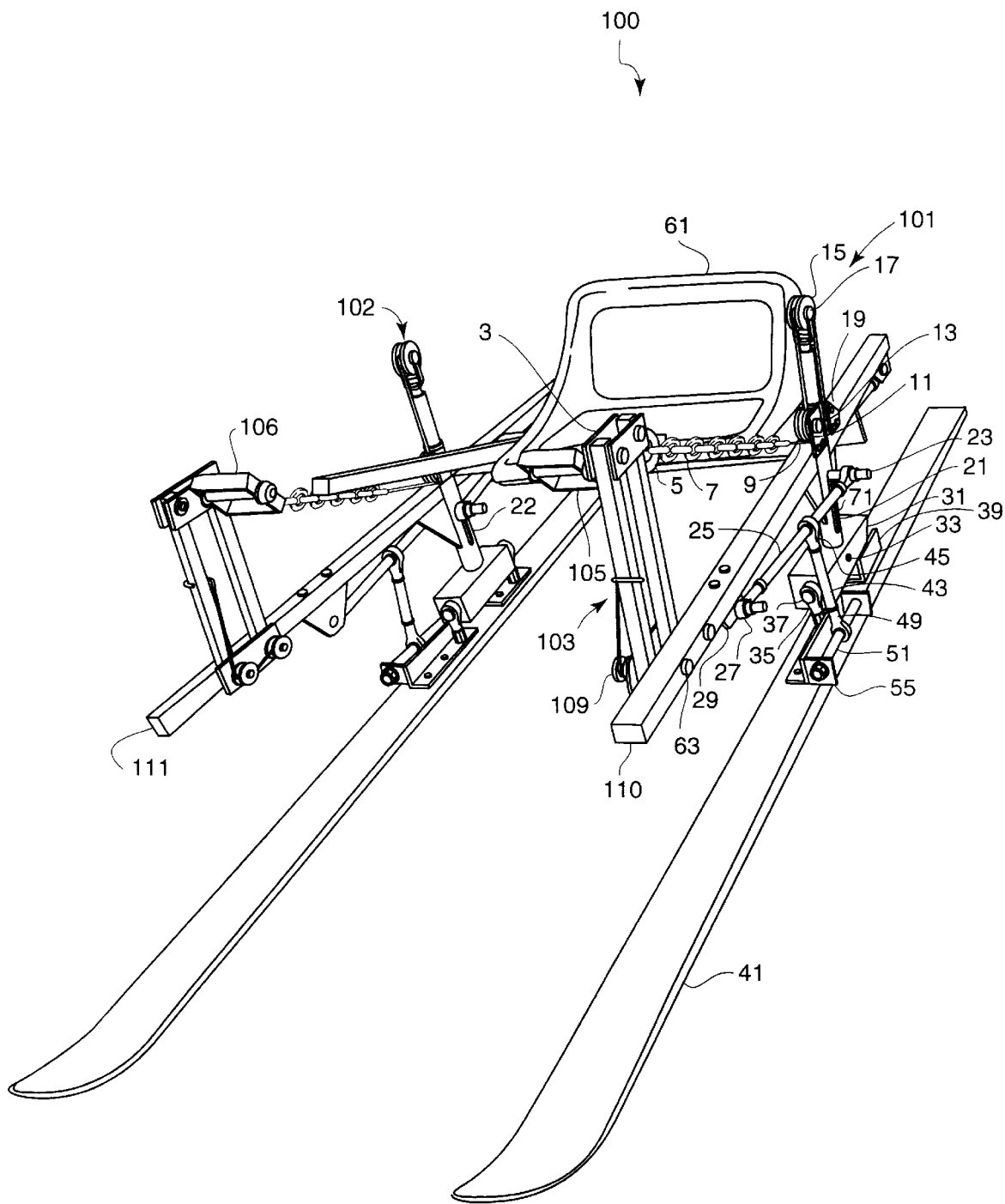
FIG. 6 is a perspective view of an apparatus constructed in accordance with a second embodiment of the present invention.
Figure 7:
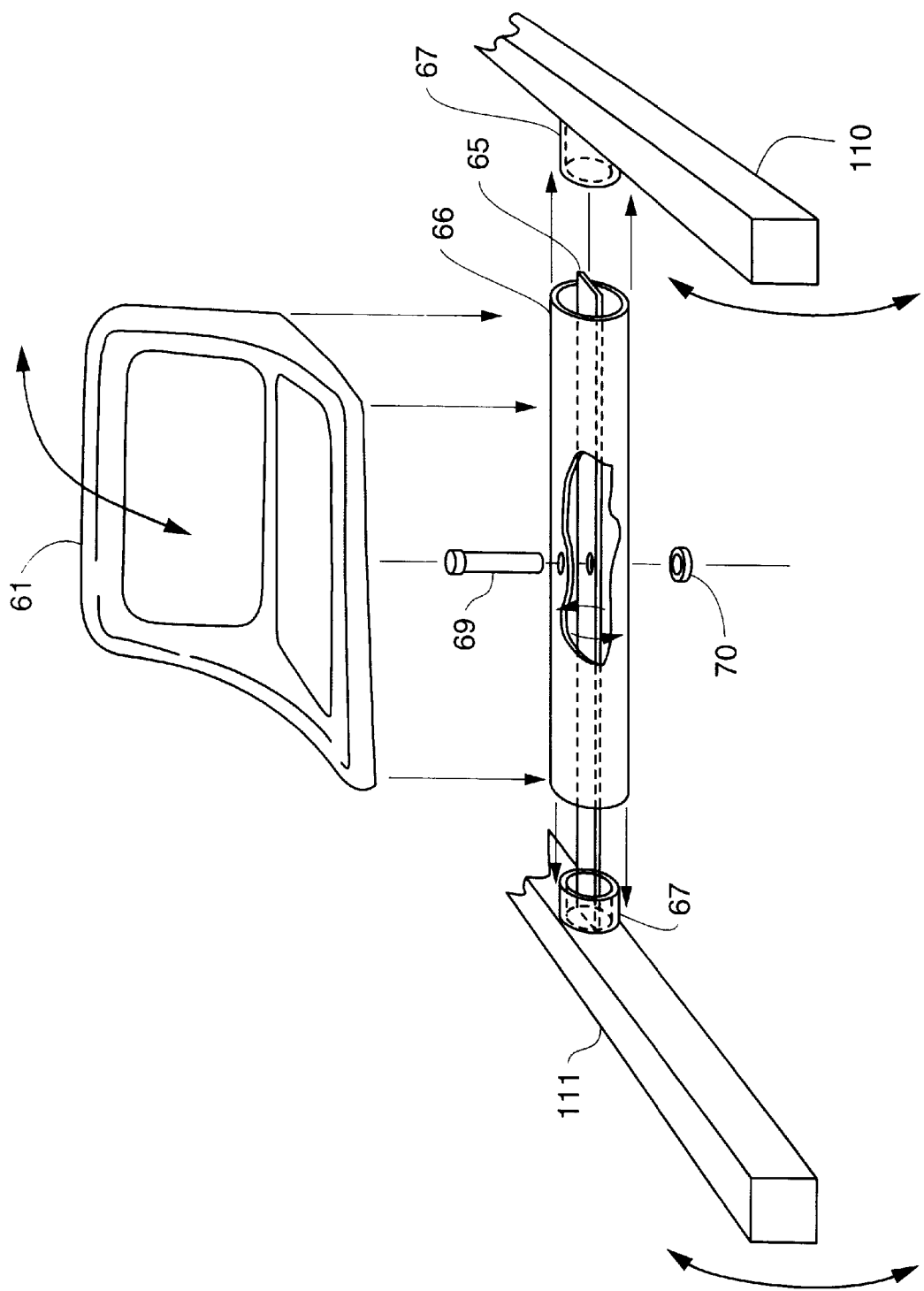
FIG. 7 is an exploded view of the torsion bar and seat assembly of the apparatus of FIG. 6.

Referring now to FIGS. 6 and 7, a preferred embodiment of the sled is illustrated wherein the seat 61 is carried on a torsion bar 65. The frame consists of a left frame member 110, and a right frame member 111, and is interconnected by the torsion bar 65. A sleeve 66 covers the torsion bar 65, and joins each frame part at the torsion bar mounts 67. Holes are provided in the torsion bar 65 and the sleeve 66 to accept the seat mounting bolt 69. The seat is then mounted to the torsion bar sleeve 66 with the seat mounting bolt 69 and the seat mounting bolt nut 70. The torsion bar allows the skis 41 and 42 and their associated steering assemblies 102 and 103 to rotate about the axis of the torsion bar 65. This then allows each ski to remain substantially parallel to the ground, aiding the ability of the sled to traverse rough terrain. An additional feature of this preferred embodiment is the inclusion of a control lever spring 109 to maintain tension on the pedal chain 7 and pedal cable 9.

To initiate a turn to the right, the operator depresses the left pedal 105. This motion causes the pedal chain 7 to pull the pedal cable 9. The tension on the pedal cable 9 exerts a downward force on the push shaft pulley 15. When the force supplied by the operator to the pedal 105 is sufficient, the tension in the pedal cable 9 forces the push shaft 21 down in relation to the frame 110. Thus the distance between the ski 41 and the frame 110 is increased, and the sled 100 is tilted to the right.

Figure 4:
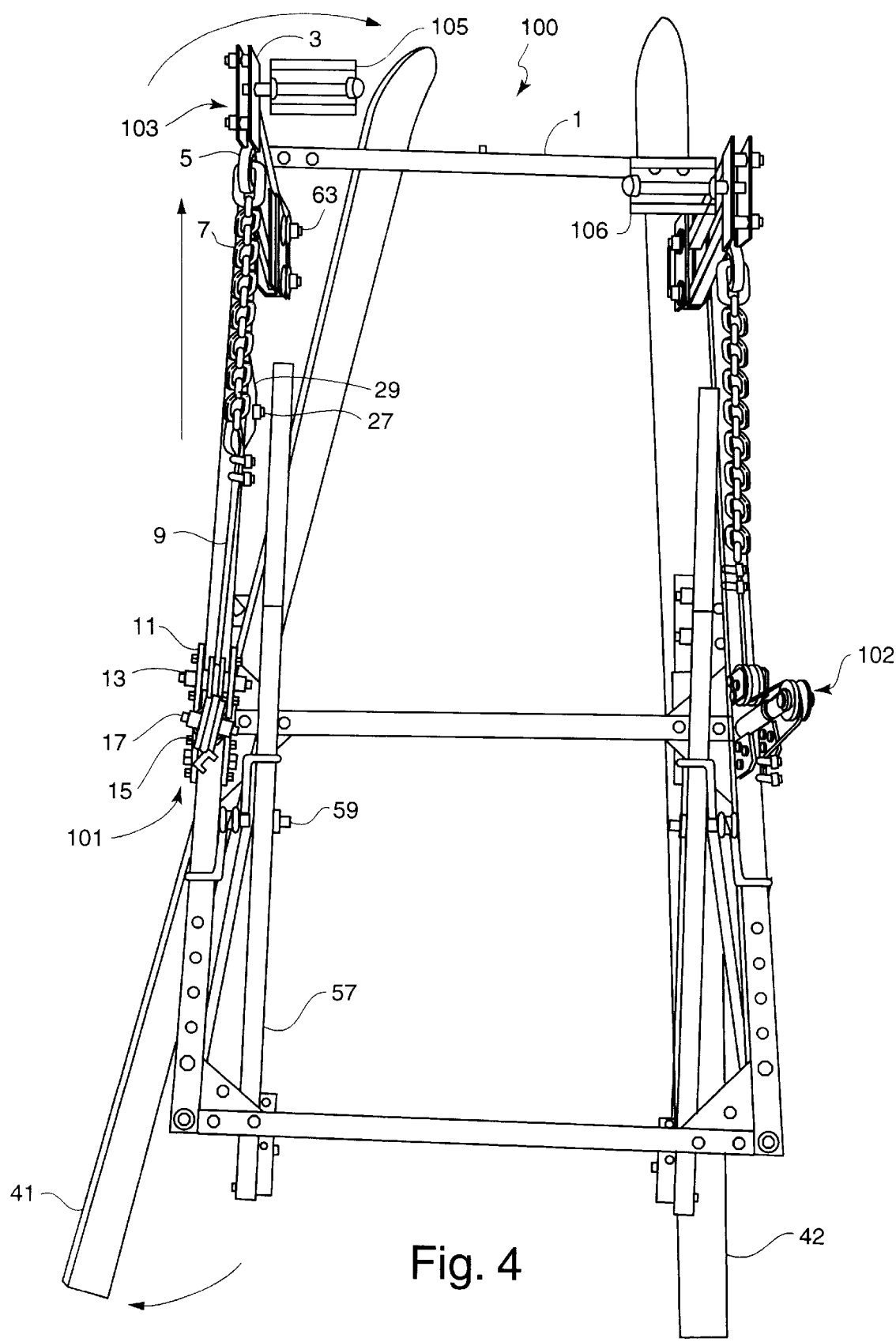
FIG. 4 is a top plan view of the apparatus of FIG. 1, showing the left ski in position to effect a right hand turn.
Figure 5:
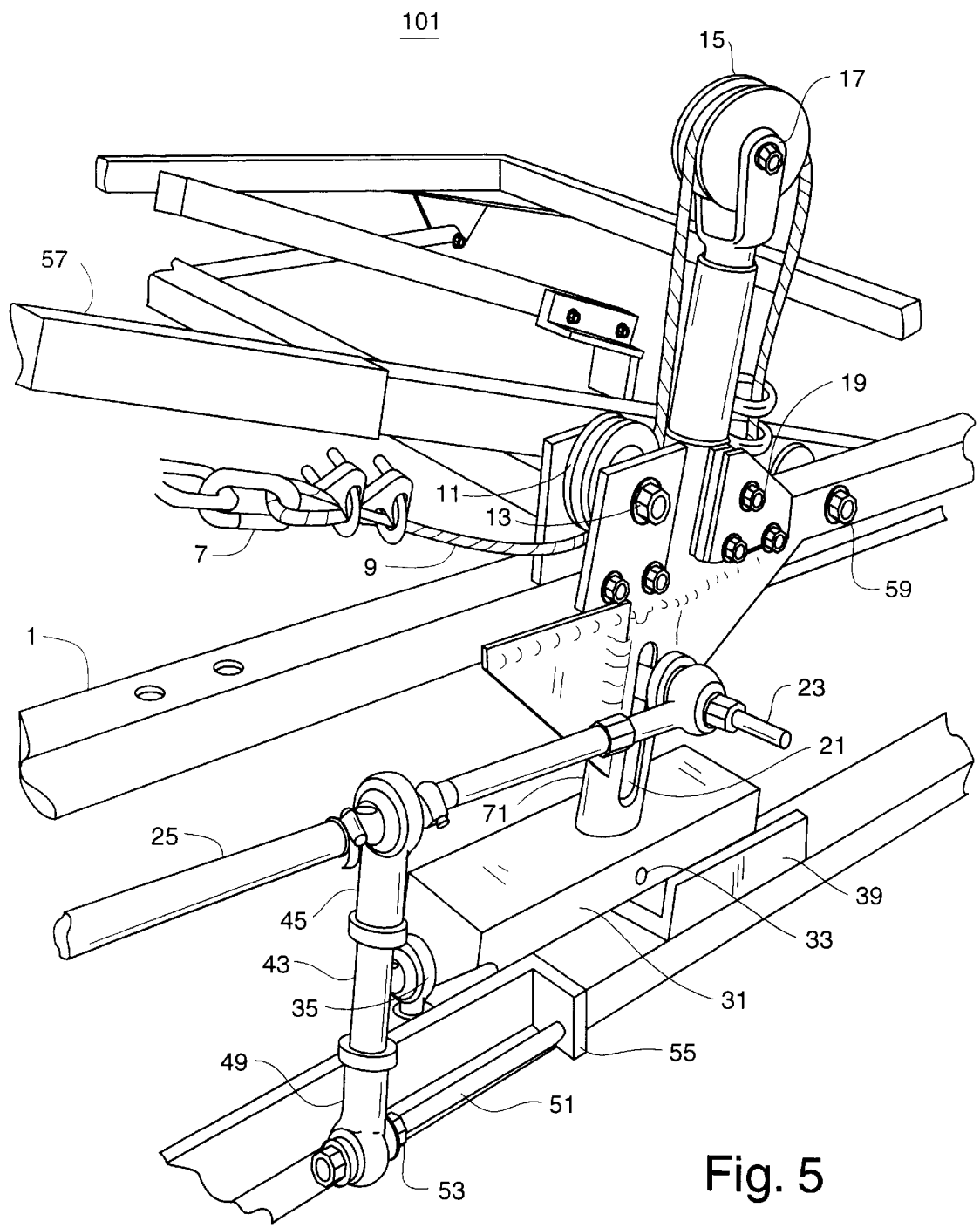
FIG. 5 is a detail of the pedal cable and push shaft pulleys of the apparatus of FIG. 1.

The downward movement of the push shaft 21 also tends to increase the distance between radius arm control shaft 23 and the radius arm pivot bracket 29. As a result, a tensile force is introduced into the radius control arm 25, causing the push shaft 21 to rotate about its vertical axis in such a way that the forward end of the ski 41 is moved towards the center line of the sled 100, and the rearward end of the ski 41 is moved away from the centerline of the sled 100. The above-described movement is illustrated in FIG. 4.

The downward movement of the push shaft 21 has an additional effect. As the push shaft 21 is forced down in relation to the frame 110, the distance between the lower tilt control shaft and the frame 110 increases. The distance between the lower tilt control shaft and the area along the radius arm 25 where the upper tilt control rod joint 45 is attached also tends to increase, although at a lesser rate. This introduces a tension in the tilt control rod 43, that pulls the lower tilt control shaft 51 up, towards the frame of the sled 110. This then causes the ski to rotate about the ski pivot joint bolt 37. In a preferred embodiment, the ski 41 is rotated in a direction such that the inner (relative to the sled 100) edge of ski 41 is brought into contact with the snow.

Figure 2:
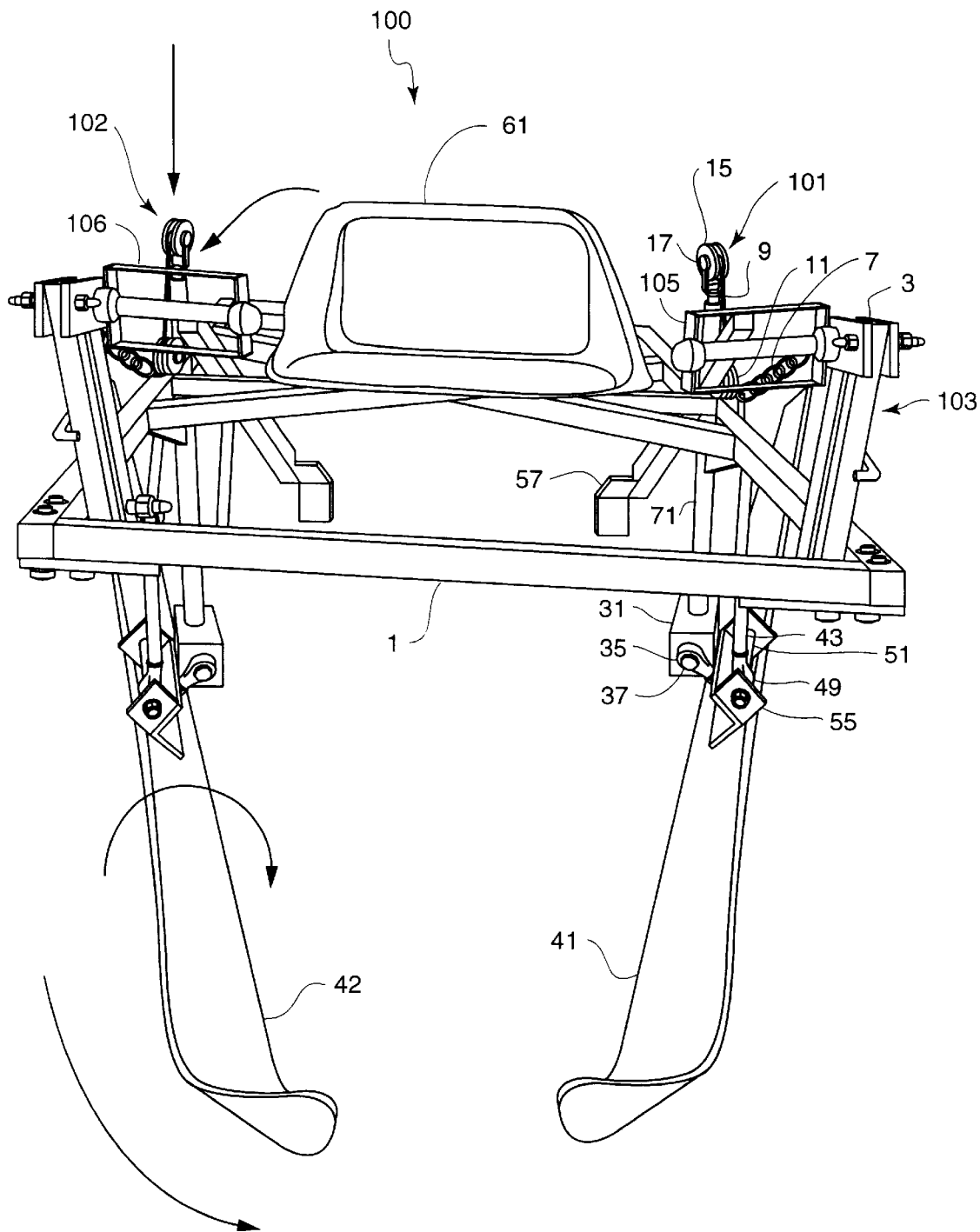
FIG. 2 is a front elevation view of the apparatus of FIG. 1, with the skis both turned to the snow plow position to brake the sled.
Figure 3:
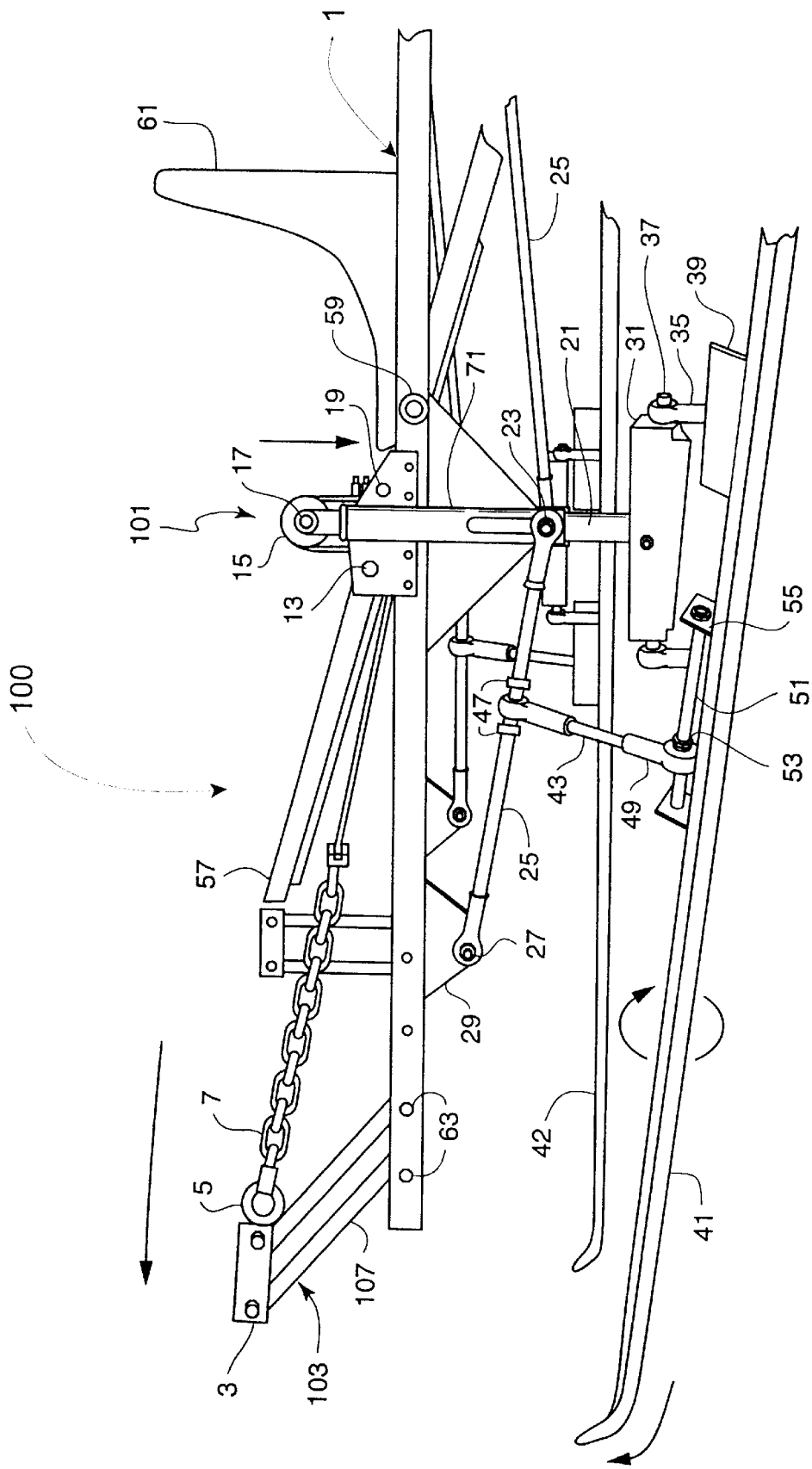
FIG. 3 is a side elevational view of the apparatus of FIG. 1.

To effect a "snow-plow" braking maneuver, the operator depresses the left pedal 105 and right pedal 106 simultaneously. As illustrated in FIG. 2, this causes both the left ski 41 and the right ski 42 to rotate about the axes of the push shafts 21 and 22, and about the axes of the ski pivot joint bolt 37 and 38. An additional braking means is provided by the brake 57. This brake is operated by pulling the brake 57 towards the operator, which rotates the brake about the brake pivot 59, and forces the lower portion of the brake 57 into contact with the snow.

The present invention has a number of advantages over previous sleds. First, the present invention allows the sled to be turned efficiently and easily, requiring only a simple push on a lever. Where a particularly tight turn is desired, in addition to fully depressing the control lever for the ski at the outside of the turn, the lever for the brake 57 on the inside of the turn can be partially depressed. This assists the sled in pivoting about the inside ski. Additionally, the sled of the present invention can be quickly braked to reduce speed by depressing both the left and right control pedals simultaneously.

Another advantage of the present invention is that it requires no balance to remain upright, and offers a smooth and stable ride over rough terrain. To further smooth the ride, springs and shocks can be added. The present invention also can be adapted to suit operators of different abilities. For instance, the described foot controls can be replaced by hand operated controls, and the sled can be adjusted to accommodate a variety of operator sizes. Additionally, the leverage of the controls can be adjusted by varying the position of the eyelet 5 along the control lever 107.

A further advantage of the present invention is that it can be assembled using commonly available materials. Thus the skis can be conventional alpine skis, and the frame can be made from commonly available PVC piping, wood, or metal.

The present invention may also be used in a variety of applications. The controls may be locked, to provide a stable platform for towing behind another vehicle, such as a snowmobile. Alternatively, the control levers may be extended to allow a skier traveling behind the sled to control it. Another use for the sled is as an undercarriage for airplanes. By substituting floats for skis, the sled may be adapted for use on water. The sled may also be used on dry land as a self-propelled vehicle by reversing the direction in which the seat and controls face or by reversing the rotation of the skis in the horizontal plane, and by adding wheels.

For purposes of clarity, the following is a list of the components shown in the drawings and the numbering associated therein:

| Component Number | Component |
| --- | --- |
| 1 | Frame |
| 3 | Pedal Assembly |
| 5 | Pedal Eyelet |
| 7 | Pedal Chain |
| 9 | Pedal Cable |
| 11 | Pedal Cable Pulley |
| 13 | Pedal Cable Pulley Bolt |
| 15 | Push Shaft Pulley |
| 17 | Push Shaft Pully Bolt |
| 19 | Pedal Cable Anchor Bolt |
| 21 | Push Shaft |
| 23 | Radius Arm Control Shaft |
| 25 | Radius Arm |
| 27 | Radius Arm Pivot |
| 29 | Radius Arm Pivot Bracket |
| 31 | Push Shaft Pivot Housing |
| 33 | Push Shaft Pivot Housing Roll Pin |

-continued

| Component Number | Component |
| --- | --- |
| 35 | Ski Pivot Joint |
| 37 | Ski Pivot Joint Bolt |
| 39 | Ski Pivot Joint Bracket |
| 41 | Left Ski |
| 42 | Right Ski |
| 43 | Tilt Control Rod |
| 45 | Tilt Control Rod Joint, Upper |
| 47 | Tilt Joint Nuts |
| 49 | Tilt Control Rod Joint, Lower |
| 51 | Tilt Control Shaft, Lower |
| 53 | Tilt Control Rod Joint Lower |
| 55 | Tilt Shaft Bracket |
| 57 | Brake |
| 59 | Brake Pivot |
| 61 | Seat |
| 63 | Pedal Pivots |
| 65 | Torsion Bar |
| 66 | Torsion Bar Sleeve |
| 67 | Torsion Bar Mount |
| 69 | Seat Mounting Bolt |
| 70 | Seat Mounting Bolt Nut |
| 71 | Push Shaft Housing |
| 100 | Sled |
| 101 | Left Steering Assembly |
| 102 | Right Steering Assembly |
| 103 | Left Control Means |
| 104 | Right Contorl Means |
| 105 | Left Pedal |
| 107 | Control Lever |
| 109 | Control Lever Spring |
| 110 | Left frame |
| 111 | Right frame |

While various embodiments of the present invention have been described in detail, it is apparent that further modifications and adaptations of the invention will occur to those skilled the art. However, it is to be expressly understood that such modifications and adaptations are within the spirit and scope of the present invention. It is intended that the appended claims be construed to include all alternative embodiments as permitted by the prior art.

What is claimed is:

1. A sled, comprising:

a frame;

a support platform interconnected to said frame for holding an object;

a first and a second ski;

a first steering means interconnected to said frame on a first end and to an upper surface of said first ski at a second end at a position proximate to a midpoint of said first ski;

a second steering means interconnected to said frame on a first end and to an upper surface of said second ski at a second end at a position proximate to a midpoint of said second ski;

a first control input means interconnected to said first steering means, wherein said first control input means is movable within a first plane; and a second control input means interconnected to said second steering means, wherein said second input means is movable within a second plane, wherein when a force is applied to one of said steering means from actuating one of said control input means by moving said one of said control input means within a corresponding one of said first or second planes, a corresponding one of said skis makes three separate but simultaneous motions, including rotation in a plane substantially parallel to that of the ground, rotation about the longitudinal axis of the ski, and movement downward in relation to the position of said frame.

2. The sled of claim 1, wherein the object held by said support platform is a person.

3. The sled of claim 1, wherein said frame is metal.

4. The sled of claim 1, wherein said frame is aluminum.

5. The sled of claim 1, wherein said frame is PVC.

6. The sled of claim 1, wherein said first and said second control input means comprise pedals.

7. A sled with steerable skis, comprising:

a frame;

a first and a second ski;

a first push shaft slidably and rotatably interconnected to said frame at a first end and to an upper surface of said first ski at a second end;

a second push shaft slidably and rotatably interconnected to said frame at a first end and to an upper surface of said second ski at a second end;

a first radius arm interconnected to said frame at a first end and to said first push shaft at a second end;

a second radius arm interconnected to said frame at a first end and to said second push shaft at a second end;

a first tilt control rod interconnected to said frame at a first end and to said first ski at a second end;

a second tilt control rod interconnected to said frame at a first end and to said second ski at a second end;

a first control member interconnected to said first push shaft and movable between first and second positions; and a second control member interconnected to said second push shaft and movable between first and second positions, wherein when a one of said first and second control members is moved from a first position to a second position, a corresponding one of said first and second push shafts is moved downward in relation to said frame, wherein said downward movement is accompanied by a rotation of said push shaft introduced by a corresponding one of said first and second radius arms, wherein said rotation of said push shaft is accompanied by a rotation of a corresponding one of said first or second skis, and wherein said downward movement is accompanied by a tilting of said one of first and second skis introduced by a corresponding one of said first and second tilt control rods.

8. The sled with steerable skis of claim 7, wherein said frame comprises a left side frame and a right side frame.

9. The sled with steerable skis of claim 8, further comprising a torsion member, wherein said left side frame and said right side frame are interconnected by said torsion member.

10. The sled with steerable skis of claim 9, further comprising a seat interconnected to said torsion member.

11. The sled with steerable skis of claim 7, wherein said movement of a one of said control members to said second position rotates a forward end of one of said skis towards a center of said sled.

12. The sled with steerable skis of claim 7, wherein said frame is metal.

13. The sled with steerable skis of claim 7, wherein said frame is PVC.

14. The sled with steerable skis of claim 7, wherein said control members comprise control pedals.

15. The sled with steerable skis of claim 7, wherein said control members comprise hand operated control levers.

16. The sled with steerable skis of claim 7, further comprising a support platform for holding an object.

17. The sled with steerable skis of claim 16, wherein the object held by said support platform is a person.

18. The sled with steerable skis of claim 7, wherein said first tilt control rod is interconnected to said frame at said first end of said first tilt control rod through said first radius arm, and wherein said second tilt control rod is interconnected to said frame at said first end of said second tilt control rod through said second radius arm.

19. The sled of claim 1, wherein a weight of said object resists said force applied to one of said steering means from actuating one of said control input means such that said three separate but simultaneous motions made in response to said force are completed in reverse after said force is removed.

* * * * *